(12) United States Patent
Premraj

(10) Patent No.: US 8,499,684 B1
(45) Date of Patent: Aug. 6, 2013

(54) CUPCAKE/MUFFIN HOLE MAKER

(76) Inventor: Upkar Premraj, Lutz, FL (US)

( * ) Notice: Subject to any disclaimer, the term of this patent is extended or adjusted under 35 U.S.C. 154(b) by 283 days.

(21) Appl. No.: 12/932,451

(22) Filed: Feb. 25, 2011

(51) Int. Cl.
*A22C 7/00* (2006.01)
*B28B 7/24* (2006.01)
*B28B 7/28* (2006.01)

(52) U.S. Cl.
USPC ............... 99/428; 99/442; 99/439; 249/122; 249/176; 249/DIG. 1

(58) Field of Classification Search
USPC ............... 99/428, 442, 439; 249/122, 176, 249/DIG. 1
See application file for complete search history.

(56) References Cited

U.S. PATENT DOCUMENTS

| | | | | |
|---|---|---|---|---|
| 1,979,429 A | * | 11/1934 | Wilkes et al. | 249/125 |
| 3,379,120 A | * | 4/1968 | Fogle | 425/346 |
| 4,801,462 A | * | 1/1989 | Tonna | 426/16 |
| 5,207,150 A | * | 5/1993 | Wellman et al. | 99/439 |
| 5,425,527 A | * | 6/1995 | Selbak | 249/122 |
| 6,276,918 B1 | * | 8/2001 | Slaughter et al. | 425/289 |
| 6,619,193 B2 | * | 9/2003 | Hinton et al. | 99/426 |
| 6,827,324 B1 | * | 12/2004 | Yother | 249/122 |
| 6,973,872 B2 | * | 12/2005 | Morgan | 99/439 |
| 2002/0078833 A1 | * | 6/2002 | Sloan et al. | 99/426 |
| 2005/0039612 A1 | * | 2/2005 | Denny | 99/450 |
| 2005/0120891 A1 | * | 6/2005 | Morgan | 99/426 |
| 2010/0221394 A1 | * | 9/2010 | Gaulard et al. | 426/231 |

* cited by examiner

*Primary Examiner* — Joseph M Pelham
*Assistant Examiner* — Gyounghyun Bae

(57) ABSTRACT

For use with a baking pan of the type formed from a sheet having a plurality of frusto-conical depressions and interspaces between the depressions, a hole maker. The hole maker includes a plate having upper and lower surfaces. A plurality of tubes each have an upper end secured to the lower surface of the plate. The tubes each have a lower end positionable in an associated depression. The upper and lower ends of each tube are separated by a tube length. A plurality of similarly configured posts are provided. The posts each have an upper end secured to the lower surface of the plate. The posts each have a lower end positionable on the upper surface of the sheet at an associated inter-spacing.

7 Claims, 2 Drawing Sheets

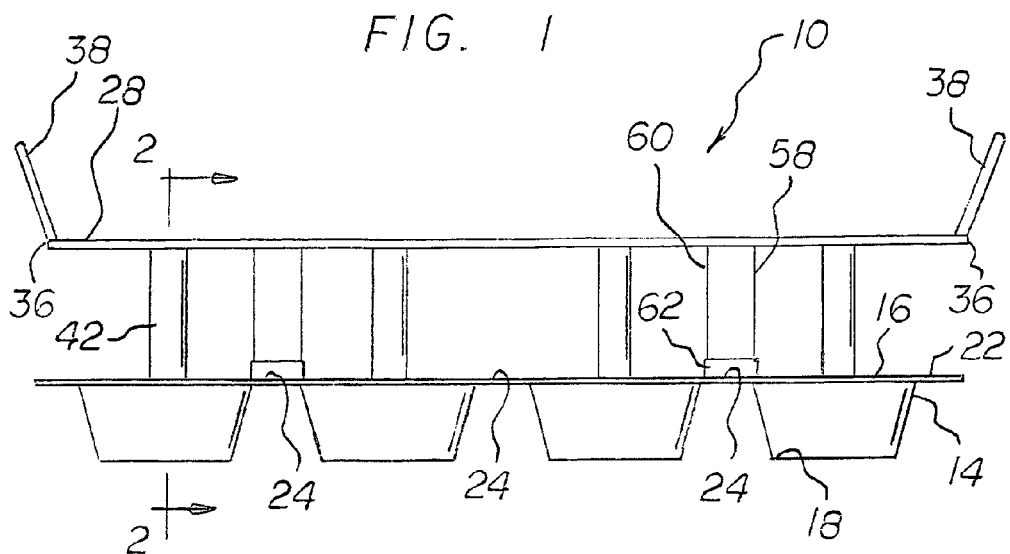
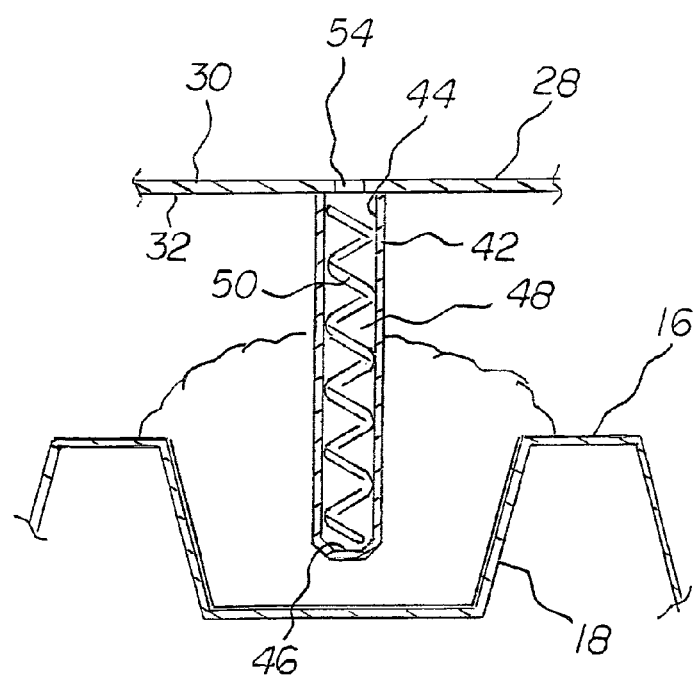

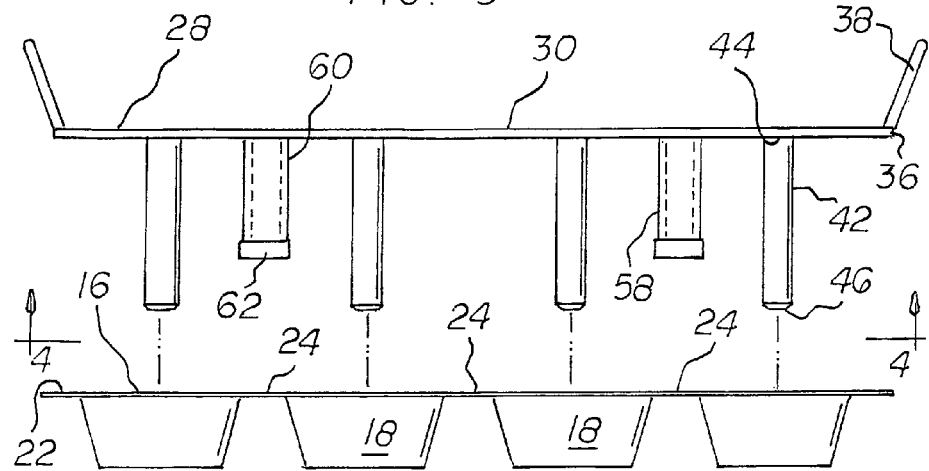
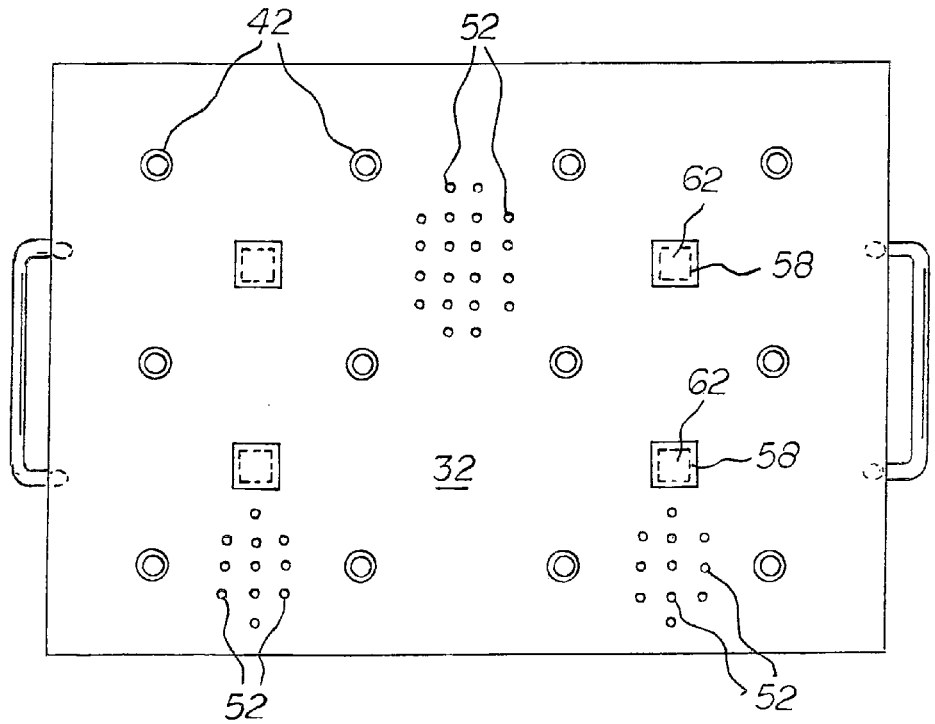

CUPCAKE/MUFFIN HOLE MAKER

BACKGROUND OF THE INVENTION

Field of the Invention

The present invention relates to a cupcake/muffin hole maker and more particularly pertains to promoting even baking throughout, and for providing a fillable pocket in cupcakes, muffins and like bakery products.

SUMMARY OF THE INVENTION

In view of the disadvantages inherent in the known types of hole makers of known designs and configurations now present in the prior art, the present invention provides an improved cupcake/muffin hole maker. As such, the general purpose of the present invention, which will be described subsequently in greater detail, is to provide a new and improved cupcake/muffin hole maker which has all the advantages of the prior art and none of the disadvantages.

To attain this, the present invention essentially comprises a cupcake/muffin hole maker. A baking pan is adapted to be used with the hole maker of the present invention. The baking pan has a sheet. The sheet is in a generally rectangular configuration. The sheet has a length of between 15 and 16 inches. The sheet has a width of 10.5 and 12 inches. The sheet has a plurality of depressions. Each of the depressions is in a frusto-conical configuration. Each of the depressions has an upper diameter of between 2 and 4 inches. Each of the depressions has a lower diameter of between 1 and 2 inches. Each of the depressions has a depth of between 1 and 1.5 inches. The depressions are provided in aligned rows of four depressions. The depressions are provided in aligned columns of three depressions. The sheet has a periphery. The periphery encompasses the rows and columns of depressions. The upper surface of the sheet has inter-spaces. The inter-spaces are provided between the depressions. The depressions are adapted to receive batter to be heated. In this manner cupcakes, muffins and like bakery products may be baked. The pan is fabricated of an essentially rigid metallic material, preferably aluminum.

A plate is provided. The plate is in a generally rectangular configuration. The plate has an upper surface. The plate has a lower surface. The plate has a length. The plate has a width. The length and width of the plate are essentially the same as the sheet.

The plate has opposed ends. The opposed ends have upturned handles. The handles are adapted to be grasped by a user. In this manner the sheet may be handled while hot following baking. The plate and the handles are fabricated of an essentially rigid metallic material, preferably aluminum.

Provided next is a plurality of similarly configured tubes. The tubes are equal in number to the number of depressions. The tubes each have an upper end. The upper ends are secured to the lower surface of the plate. The tubes each have a lower end. The lower ends are positioned in an associated depression during use. Each tube lower end is closed. Each upper end is open. Each tube has a hollow interior. The hollow interior is provided between the upper and lower ends. The upper and lower ends of each tube are spaced by a tube length. A thermally conductive coil is provided. The coil is provided within the interior of an associated tube. Each coil has a coil length greater than 90 percent of the tube length. Each coil has a coil diameter of a size to contact the tube. Each coil is fabricated of copper. The plate has a plurality of holes throughout. In this manner the weight of the plate is reduced. Further, in this manner, hot air is allowed to circulate between the plate with the attached tubes and the sheet of frusto-conical depressions. The holes include larger holes. The larger holes are in communication with the interiors of the tubes. The tubes provide surfaces against which the batter is adapted to rise during baking. The coils enhance the heat. In this manner the batter is evenly heated.

Provided last is a plurality of similarly configured posts. The posts are in a rectangular orientation. The number of posts is less than the number of inter-spacings. The posts each have an upper end. The upper ends are secured to the lower surface of the plate. The posts each have a lower end. The lower ends are positioned on the upper surface of the sheet at an associated inter-spacing during use. The upper and lower ends of each post are spaced by a post length equal to between 50 and 75 percent of the tube length. In this manner the lower end of each tube will be spaced from the lower end of each depression by a distance between 25 and 50 percent of the depth of each depression. Each post is fabricated of an essentially rigid metallic material, preferably aluminum.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cupcake/muffin hole maker which has all of the advantages of the prior art hole makers of known designs and configurations and none of the disadvantages.

It is another object of the present invention to provide a new and improved cupcake/muffin hole maker which may be easily and efficiently manufactured and marketed.

It is further object of the present invention to provide a new and improved cupcake/muffin hole maker which is of durable and reliable constructions.

An even further object of the present invention is to provide a new and improved cupcake/muffin hole maker which is susceptible of a low cost of manufacture with regard to both materials and labor, and which accordingly is then susceptible of low prices of sale to the consuming public, thereby making such cupcake/muffin hole maker economically available to the buying public.

Even still another object of the present invention is to provide a cupcake/muffin hole maker for promoting even baking throughout, and for providing a fillable pocket in cupcakes, muffins and like bakery products.

Lastly, it is an object of the present invention to provide a new and improved hole maker for use with a baking pan formed from a sheet having a plurality of frusto-conical depressions and inter-spaces between the depressions. The hole maker includes a plate having upper and lower surfaces. A plurality of tubes each have an upper end secured to the lower surface of the plate. The tubes each have a lower end positionable in an associated depression. The upper and lower ends of each tube are separated by a tube length. A plurality of similarly configured posts are provided. The posts each have an upper end secured to the lower surface of the plate. The posts each have a lower end positionable on the upper surface of the sheet at an associated inter-spacing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a cupcake/muffin hole maker constructed in accordance with the principles of the present invention.

FIG. 2 is a cross sectional view taken along line 2-2 of FIG. 1.

FIG. 3 is a side elevational view of a cupcake/muffin hole maker similar to FIG. 1 but with the plate lifted prior to use.

FIG. 4 is a cross sectional view taken along line 4-4 of FIG. 3.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved cupcake/muffin hole maker embodying the principles and concepts of the present invention and generally designated by the reference numeral 10 will be described.

The present invention, the cupcake/muffin hole maker 10 is comprised of a plurality of components. Such components in their broadest context include a baking pan, a plate, a plurality of tubes and a plurality of posts. Such components are individually configured and correlated with respect to each other so as to attain the desired objective.

First provided is a baking pan 14. The baking pan has a sheet 16. The sheet is in a generally rectangular configuration. The sheet has a length of between 15 and 16 inches. The sheet has a width of between 10.5 and 12 inches. The sheet has a plurality of depressions 18. Each of the depressions is in a frusto-conical configuration. Each of the depressions has an upper diameter of between 2 and 4 inches. Each of the depressions has a lower diameter of between 1 and 2 inches. Each of the depressions has a depth of between 1 and 1.5 inches. The depressions are provided in aligned rows of four depressions. The depressions are provided in aligned columns of three depressions. The sheet has a periphery 22. The periphery encompasses the rows and columns of depressions. The upper surface of the sheet has inter-spaces 24. The inter-spaces are provided between the depressions. The depressions are adapted to receive batter to be heated. In this manner cupcakes muffins and like bakery products may be baked. A bakery product is shown in FIG. 2. The pan is fabricated of an essentially rigid metallic material, preferably aluminum.

A plate 28 is provided. The plate is in a generally rectangular configuration. The plate has an upper surface 30. The plate has a lower surface 32. The plate has a length. The plate has a width. The length and width of the plate are essentially the same as the sheet.

The plate has opposed ends 36. The opposed ends have upturned handles 38. The handles are adapted to be grasped by a user. In this manner the sheet may be handled while hot following baking. The plate and the handles are fabricated of an essentially rigid metallic material, preferably aluminum.

Provided next is a plurality of similarly configured tubes 42. The tubes are equal in number to the number of depressions. The tubes each have an upper end 44. The upper ends are secured to the lower surface of the plate. The tubes each have a lower end 46. The lower ends are positioned in an associated depression during use. Each tube lower end is closed. Each tube upper end is open. Each tube has a hollow interior 48. The hollow interior is provided between the upper and lower ends. The upper and lower ends of each tube are spaced by a tube length. A thermally conductive coil 50 is provided. The coil is provided within the interior of an associated tube. Each coil has a coil length greater than 90 percent of the tube length. Each coil has a coil diameter of a size to contact the tube. Each coil is fabricated of copper. The plate has a plurality of holes 52 throughout. In this manner the weight of the plate is reduced. Further, in this manner, hot air is allowed to circulate between the plate with the attached tubes and the sheet of frusto-conical depressions. The holes include larger holes 54. The larger holes are in communication with the interiors of the tubes. The tube provides a surface against which the batter is adapted to rise during baking. The coil enhances the heat. In this manner the batter is evenly heated.

Provided last is a plurality of similarly configured posts 58. The posts are in a rectangular orientation. The number of posts is less than the number of inter-spacings. The posts each have an upper end 60. The upper ends are secured to the lower surface of the plate. The posts each have a lower end 62. The lower ends are positioned on the upper surface of the sheet at an associated inter-spacing during use. The upper and lower ends of each post are spaced by a post length equal to between 50 and 75 percent of the tube length. In this manner the lower end of each tube will be spaced from the lower end of each depression by a distance between 25 and 50 percent of the depth of each depression. Each post is fabricated of an essentially rigid metallic material, preferably aluminum.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cupcake/muffin hole maker (10) for promoting even baking throughout, and for providing a fillable pocket in cupcakes, muffins and like bakery products, the system comprising, in combination:
   a baking pan (14) formed of a sheet (16) in a generally rectangular configuration, the sheet having a length a width, the sheet being formed with a plurality of depressions (18), each of the depressions being in a frusto-conical configuration with an upper diameter and a lower diameter and a depth, the depressions being in an aligned row of plural depressions and an aligned column of plural depressions, the sheet having a periphery (22) encompassing the rows and columns of depressions, the upper surface of the sheet having inter-spaces (24) on opposite sides of a plurality of the depressions, the depressions adapted to receive batter to be heated for baking cupcakes, muffins and like bakery products;
   a plate having upper and lower surfaces;
   a plurality of tubes each having an upper end secured to the lower surface of the plate, the tubes each having a lower end positionable in an associated depression, the upper and lower ends of each tube being separated by a tube length; and
   a plurality of similarly configured posts, the posts each having an upper end secured to the lower surface of the plate, the posts each having a lower end positionable on the upper surface of the sheet at an associated inter-spacing.

2. The hole maker as set forth in claim 1 wherein the plate and the tubes and the posts are fabricated of a rigid metallic material.

3. The hole maker as set forth in claim 1 wherein the plate and the tubes and the posts are fabricated of aluminum.

4. The hole maker as set forth in claim 1 wherein the tubes are in an aligned rows of four tubes and aligned columns of three tubes.

5. The hole maker as set forth in claim 1 and further including:
   a thermally conductive coil within each tube, each coil having a coil length greater than 90 percent of the tube length, each coil having a coil diameter of a size to contact the tube.

6. The hole maker as set forth in claim 4 wherein the coil is fabricated of copper.

7. A cupcake/muffin hole maker (10) for promoting even baking throughout, and for providing a fillable pocket in cupcakes, muffins and like bakery products, the system comprising, in combination:
   a baking pan (14) formed of a sheet (16) in a generally rectangular configuration, the sheet having a length of between 15 and 16 inches and a width of between 10.5 and 12 inches, the sheet being formed with a plurality of depressions (18), each of the depressions being in a frusto-conical configuration with an upper diameter of between 2 and 4 inches and a lower diameter of between 1 and 2 inches and a depth of between 1 and 1.5 inches, the depressions being in an aligned row of four depressions and an aligned column of three depressions, the sheet having a periphery (22) encompassing the rows and columns of depressions, the upper surface of the sheet having inter-spaces (24) on opposite sides of a plurality of the depressions, the depressions adapted to receive batter to be heated for baking cupcakes, muffins and like bakery products, the pan being fabricated of aluminum;
   a plate (28) in a generally rectangular configuration, the plate having an upper surface (30) and a lower surface (32), the plate having a length and a width essentially the same as the sheet;
   the plate having opposed ends (36) with upturned handles (38) adapted to be grasped by a user for handling the sheet while hot following baking, the plate and the handles being fabricated of aluminum;
   a plurality of similarly configured tubes (42) equal in number to the number of depressions, the tubes each having an upper end (44) secured to the lower surface of the plate, the tubes each having a lower end (46) positioned in an associated depression during use, each tube lower end being closed, each upper end being open, each tube having a hollow interior (48) between the upper and lower ends, the upper and lower ends of each tube being spaced by a tube length, a coil (50) within the interior of an associated tube, each coil having a coil length greater than 90 percent of the tube length, each coil having a coil diameter of a size to contact the tube, each coil being fabricated of copper, a plurality of holes (52) throughout the plate for weight reduction and heat abatement purposes, the holes including larger holes (54) in communication with the interiors of the tubes; and
   a plurality of similarly configured posts (58) in a rectangular orientation and in a number less than the number of inter-spacings, the posts each having an upper end (60) secured to the lower surface of the plate, the posts each having a lower end (62) positioned on the upper surface of the sheet at an associated inter-spacing during use, the upper and lower ends of each post being spaced by a post length equal to between 50 and 75 percent of the tube length whereby the lower end of each tube will be spaced from the lower end of each depression by a distance between 25 and 50 percent of the depth of each depression, each post being fabricated of aluminum.

* * * * *